US008826034B1

United States Patent
Kennedy

(10) Patent No.: US 8,826,034 B1
(45) Date of Patent: Sep. 2, 2014

(54) SELECTIVE REVOCATION OF HEURISTIC EXEMPTION FOR CONTENT WITH DIGITAL SIGNATURES

(75) Inventor: Mark Kevin Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1747 days.

(21) Appl. No.: 11/864,747

(22) Filed: Sep. 28, 2007

(51) Int. Cl.
*G06F 11/00* (2006.01)

(52) U.S. Cl.
USPC .............................................. 713/188; 726/22

(58) Field of Classification Search
CPC ... G06F 21/564; G06F 21/562; H04L 63/145; H04L 63/1416
USPC ...................... 713/188; 726/22–25
See application file for complete search history.

(56) References Cited

U.S. PATENT DOCUMENTS

| 6,367,012 | B1 * | 4/2002 | Atkinson et al. ............... 713/176 |
| 7,650,409 | B2 * | 1/2010 | Cain et al. ...................... 709/225 |
| 2003/0074581 | A1 * | 4/2003 | Hursey et al. .................. 713/201 |
| 2003/0154409 | A1 * | 8/2003 | Morota et al. ................. 713/201 |
| 2004/0107345 | A1 * | 6/2004 | Brandt et al. .................. 713/171 |
| 2004/0153644 | A1 * | 8/2004 | McCorkendale et al. .... 713/156 |
| 2006/0218637 | A1 * | 9/2006 | Thomas et al. .................. 726/23 |
| 2007/0157321 | A1 * | 7/2007 | Errico et al. ..................... 726/28 |
| 2008/0141332 | A1 * | 6/2008 | Treinen ............................. 726/1 |
| 2008/0263659 | A1 * | 10/2008 | Alme ................................ 726/22 |
| 2009/0182818 | A1 * | 7/2009 | Krywaniuk .................... 709/206 |
| 2009/0287653 | A1 * | 11/2009 | Bennett ............................. 707/3 |
| 2012/0260304 | A1 * | 10/2012 | Morris et al. ...................... 726/1 |

* cited by examiner

*Primary Examiner* — Eleni Shiferaw
*Assistant Examiner* — Phy Anh Vu
(74) *Attorney, Agent, or Firm* — Brill Law Office; Jeffrey Brill

(57) ABSTRACT

Digital signatures are examined for specified attributes indicating that an exemption is not appropriate. If the specified attributes are not present in a digital signature, the associated application will be exempt from heuristic detection. However, where the specified attributes are present in a signature, the signed application is subject to heuristic detection just like a non-signed application. This does not mean the application is automatically treated as being malicious, but simply that the application is scrutinized to check for malicious behavior.

15 Claims, 2 Drawing Sheets

SELECTIVE REVOCATION OF HEURISTIC EXEMPTION FOR CONTENT WITH DIGITAL SIGNATURES

TECHNICAL FIELD

This invention pertains generally to computer security, and more specifically to selectively revoking heuristic exemptions for content with digital signatures.

BACKGROUND ART

Heuristic detection is commonly used by security software to check for and detect malicious code (e.g., viruses, worms, Trojan horses, etc.) Security software often exempts applications with Digital Signatures from heuristic detection. This is a good policy, as it both reduces false positives and allows trusted third party applications to bypass heuristic detection without requiring interaction with the publisher of the security software.

However, sometimes a digital signature provider provides signatures to entities which the security software publisher does not trust. This can occur because the signature authority made a mistake, or because the signature provider and the security software publisher have different standards as to what constitutes a trusted party. For example, digital signatures are granted to some companies that have been known to distribute commercial spyware applications. In this case, it would not be appropriate to grant a blanket heuristic detection exemption to files from such a company. On the other hand, the company may ship applications that do not contain spyware, so it is also not appropriate to assume that all files from such a company are known to be a threat.

It would be desirable to be able to revoke the exemption given to applications with digital signatures where desired, without presupposing that files originating from an entity with a revoked exemption comprise a threat per se.

SUMMARY

Applications with valid digital signatures are, by default, exempted from heuristic detection. However, there are cases where this exemption is not warranted (for example, where the company distributing the application has been known to distribute commercial spyware or adware). For this reason, digital signatures are examined for specified attributes indicating that an exemption is not appropriate. If the specified attributes are not present in a digital signature, the associated application will be exempt from heuristic detection. However, where the specified attributes are present in a signature, the signed application is subject to heuristic detection just like a non-signed application. This does not mean the application is automatically treated as being malicious, but simply that the application is scrutinized to check for malicious behavior.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
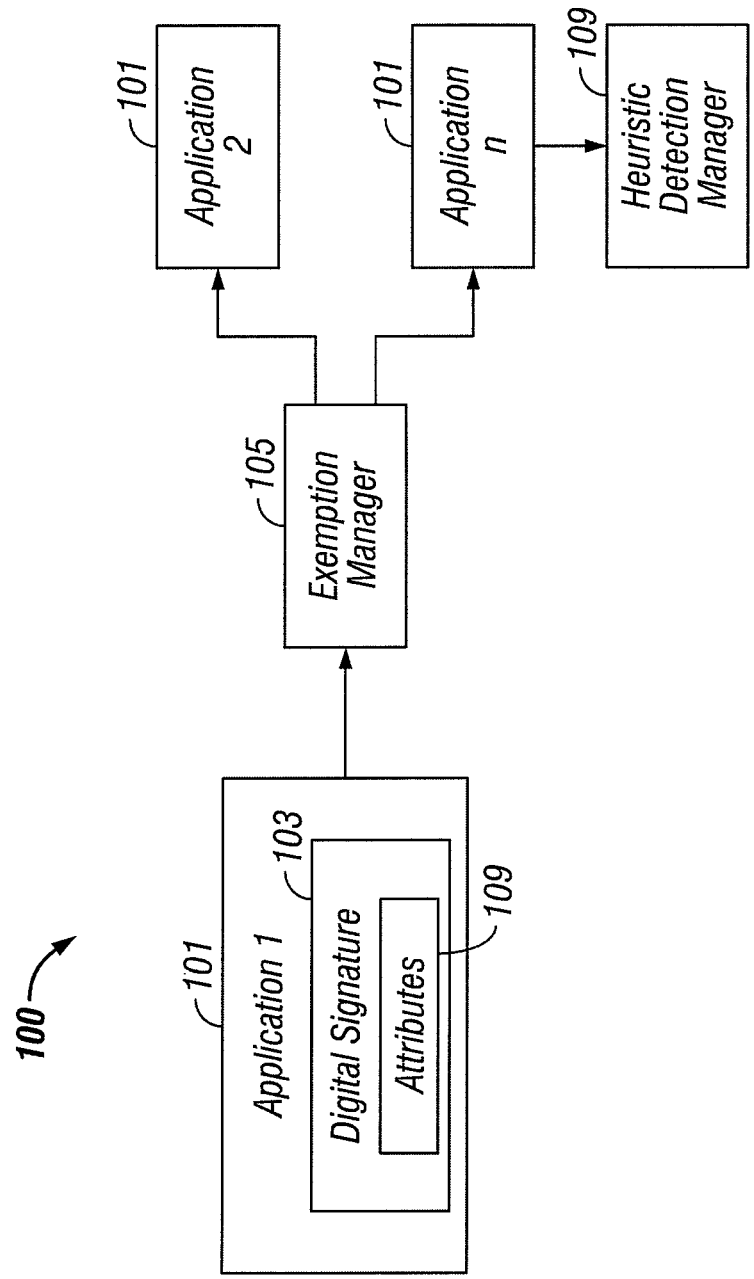
FIG. 1 is a block diagram illustrating a system in which an exemption manager selectively revokes heuristic detection exemptions for digitally signed content, according to some embodiments of the present invention.

FIG. 1 illustrates a system 100 in which heuristic exemptions for applications 101 with digital signatures 103 are selectively revoked, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, an exemption manager 105 by default exempts applications 101 (or other digital content) with valid digital signatures 103 meeting a given security standard from heuristic detection processing. An example of a valid digital signature 103 is a Verisign Class 3 Code Signing Certificate. The exemption manager 105 examines the digital signature 103 and "revokes" the exemption if certain attributes 109 are present, thereby subjecting the application 101 to standard heuristic detection (illustrated in FIG. 1 as processing by a heuristic detection manager 107).

When examining the digital signature 103, the exemption manager 105 can check for any given signature attribute 109 (or combination of attributes 109). In other words, as explained in greater detail in conjunction with FIG. 2, digital signatures 103 have specific attributes 109. The exemption manager 105 can examine digital signatures 103 for the presence of attribute(s) 109 that have been specified as indicating that an exemption revocation is desired. If the specified attribute(s) 109 are not present in the signature 103, the signed content 101 will be exempt from heuristic detection. However, when a match is found, the application 101 will be monitored by the heuristic detection manager 107 just like any non-exempt content 101. Note that this does not mean the application 101 is automatically treated as being malicious. It simply means that the application 101 will be scrutinized for malicious behavior like any other non-trusted application 101.

Figure 2:
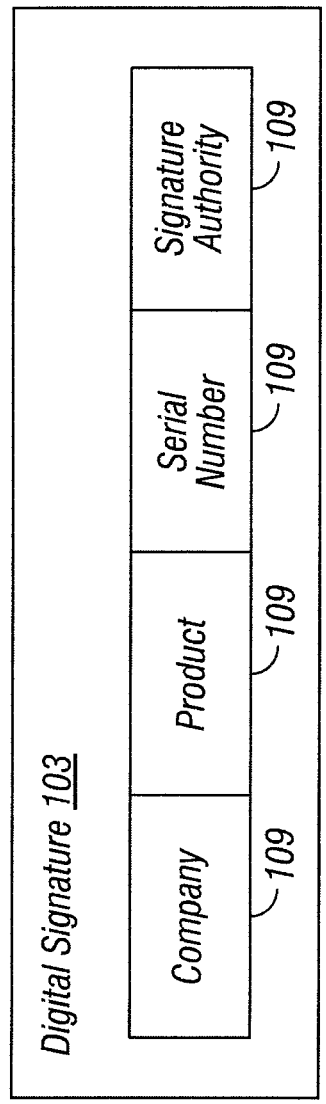
FIG. 2 is a block diagram illustrating attributes of a digital signature, according to some embodiments of the present invention.

Turning now to FIG. 2, an example digital signature 103 is illustrated. The digital signature 103 has specific attributes 109 which comprise digital representations of information such as the company from which the content originates, the product name, the product serial number, identifying information concerning the signature authority, etc. Of course, the attributes 109 illustrated in FIG. 2 are only examples provided for the sake of explanation. An actual digital signature 109 typically has more and different attributes, represented in different formats.

As illustrated in FIG. 2, the exemption manager 105 examines signatures 103 and checks for the presence of a specified attribute 109 or combination thereof. For example, specified attribute(s) 109 could be all content originating from a specific source (known to distribute spyware), a specific product (known to contain adware), a specific product originating from a specific source, etc. Depending upon whether or not the specified attribute(s) 109 are found, the exemption manager 105 either exempts or subjects the content 101 to heuristic detection, as explained above.

It is to be understood that the specified attributes 109 can represent any characteristics which are believed to indicate a need to subject content 101 to heuristic detection. The specific attributes 109 to use are a design variable, which can be set and modified (e.g., "at the factory" and/or via dynamic updates) by the publisher of the security software. In some embodiments, these attributes 109 can also be specified and/or edited by users of the security software and/or by trusted third parties.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for selectively revoking heuristic exemptions for digital content with digital signatures, the method comprising the steps of:

exempting, by default, digital content received at a computing device with a valid digital signature from heuristic detection, the valid digital signature being issued by a signature authority and comprising at least one attribute that represents information including a company from which the content originates, a product name, a product serial number, or identifying information concerning the signature authority concerning the digital content;

examining content of at least one digital signature associated with digital content to determine whether the content of the at least one digital signature contains at least one specified attribute, the at least one specified attribute comprising predetermined content in the at least one digital signature that is known as suspicious; and responsive to determining that an examined digital signature contains at least one specified attribute comprising predetermined content in the at least one digital signature that is known as suspicious, subjecting digital content associated with the examined digital signature to heuristic detection.

2. The method of claim 1 wherein exempting, by default, digital content with a valid digital signature from heuristic detection further comprises:

exempting, by default, digital content with a valid digital signature meeting a given security standard from heuristic detection.

3. The method of claim 1 wherein determining that the content of a digital signature contains at least one specified attribute further comprises:

determining that the content of the digital signature contains a single specified attribute.

4. The method of claim 1 wherein determining that the content of a digital signature contains at least one specified attribute further comprises:

determining that the content of the digital signature contains a specified combination of attributes.

5. The method of claim 1, wherein the digital content further comprises:

at least one application.

6. At least one non-transitory computer readable medium storing a computer program product for selectively revoking heuristic exemptions for digital content with digital signatures, the computer program product comprising:

program code for exempting, by default, digital content with a valid digital signature from heuristic detection, the valid digital signature being issued by a signature authority and comprising at least one attribute that represents information including a company from which the content originates, a product name, a product serial number, or identifying information concerning the signature authority concerning the digital content;

program code for examining content of at least one digital signature associated with digital content to determine whether the content of the at least one digital signature contains at least one specified attribute, the at least one specified attribute comprising predetermined content in the at least one digital signature that is known as suspicious; and program code for, responsive to determining that an examined digital signature contains at least one specified attribute comprising predetermined content in the digital signature that is known as suspicious, subjecting digital content associated with the examined digital signature to heuristic detection.

7. The computer program product of claim 6 wherein the program code for exempting, by default, digital content with a valid digital signature from heuristic detection further comprises:

program code for exempting, by default, digital content with a valid digital signature meeting a given security standard from heuristic detection.

8. The computer program product of claim 6 wherein the program code for determining that the content of a digital signature contains at least one specified attribute further comprises:

program code for determining that the content of the digital signature contains a single specified attribute.

9. The computer program product of claim 6 wherein the program code for determining that the content of a digital signature contains at least one specified attribute further comprises:

program code for determining that the content of the digital signature contains a specified combination of attributes.

10. The computer program product of claim 6 wherein the digital content further comprises:

at least one application.

11. A computer system, at least partially implemented in hardware, for selectively revoking heuristic exemptions for digital content with digital signatures, the computer system comprising:

a processor; and a memory, the memory stores machine readable instructions, which when executed by the processor cause the processor to perform the following steps:

by default, exempting by an exemption manager, digital content with a valid digital signature from heuristic detection, the valid digital signature being issued by a signature authority and comprising at least one attribute that represents information including a company from which the content originates, a product name, a product serial number, or identifying information concerning the signature authority concerning the digital content;

examining by an examination manager, content of at least one digital signature associated with digital content to determine whether the content of the at least one digital signature contains at least one specified attribute, the at least one specified attribute comprising predetermined content in the at least one digital signature information concerning the digital content that is known as suspicious; and subjecting by a heuristic detection manager, digital content associated with the examined digital signature to heuristic detection, in response to determining that an examined digital signature contains at least one specified attribute comprising predetermined content in the digital signature information concerning the digital content that is known as suspicious.

12. The computer system of claim 11 wherein the exemption manager is further configured to exempt digital content with a valid digital signature meeting a given security standard from heuristic detection.

13. The computer system of claim 11 wherein the examining manager is further configured to determine that the content of the digital signature contains a single specified attribute.

14. The computer system of claim 11 wherein the examining manager is further configured to determine that the content of the digital signature contains a specified combination of attributes.

15. The computer program product of claim 11 wherein the digital content further comprises:

at least one application.

* * * * *